United States Patent
Roh et al.

(10) Patent No.: US 10,790,935 B2
(45) Date of Patent: Sep. 29, 2020

(54) SYSTEM AND METHOD FOR EFFICIENTLY TRANSMITTING ERROR-TOLERANT TRAFFIC IN LOW POWER AND LOSSY NETWORKS

(71) Applicant: AGENCY FOR DEFENSE DEVELOPMENT, Daejeon (KR)

(72) Inventors: Bongsoo Roh, Daejeon (KR); Myungsup Lee, Seoul (KR); Saewoong Bahk, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/451,162

(22) Filed: Jun. 25, 2019

(65) Prior Publication Data

US 2020/0195379 A1    Jun. 18, 2020

(30) Foreign Application Priority Data

Dec. 14, 2018    (KR) .......................... 10-2018-0162374

(51) Int. Cl.
*H04L 1/00*     (2006.01)
*H04B 17/318*   (2015.01)

(52) U.S. Cl.
CPC ......... *H04L 1/0083* (2013.01); *H04B 17/318* (2015.01); *H04L 1/009* (2013.01)

(58) Field of Classification Search
CPC ....... H04B 17/318; H04B 7/00; H04L 1/0083; H04L 1/009
USPC ........................................................ 370/310
See application file for complete search history.

(56) References Cited

U.S. PATENT DOCUMENTS

| | | | |
|---|---|---|---|
| 7,428,408 B2 | 9/2008 | Cha et al. | |
| 8,743,887 B2 | 6/2014 | Balasubramanian et al. | |
| 9,538,395 B2 | 1/2017 | Sadek et al. | |
| 9,780,925 B2* | 10/2017 | Sung | H04L 1/203 |
| 2005/0186963 A1* | 8/2005 | VanLaningham | H04L 25/0222 455/452.1 |
| 2007/0253352 A1* | 11/2007 | Arisha | H04W 52/245 370/328 |
| 2008/0095222 A1* | 4/2008 | VanLaningham | H04L 45/123 375/227 |
| 2011/0280214 A1* | 11/2011 | Lee | H04L 67/327 370/331 |

(Continued)

FOREIGN PATENT DOCUMENTS

| | | |
|---|---|---|
| JP | 2008-514133 A | 5/2008 |
| JP | 2013-211911 A | 10/2013 |
| JP | 2016-512410 A | 4/2016 |

(Continued)

*Primary Examiner* — Robert J Lopata

(74) *Attorney, Agent, or Firm* — Scully Scott Murphy and Presser

(57) ABSTRACT

The present invention relates to a method for efficiently transmitting error-tolerant traffic in low power and lossy networks (LLNs). The method for transmitting an error-tolerant traffic includes when a packet is received, modifying a medium access control (MAC) layer of a receiving device to perform received signal strength indication (RSSI) sampling at a symbol rate and estimating a symbol error rate of the packet in the MAC layer based on the sampled RSSI value, and when the estimated symbol error rate is lower than a specific value, transmitting the received packet to a higher layer.

6 Claims, 3 Drawing Sheets

(56) References Cited

U.S. PATENT DOCUMENTS

2013/0114482 A1    5/2013  Oh et al.
2016/0192212 A1*   6/2016  Ko ........................ H04W 40/12
                                                          370/252

FOREIGN PATENT DOCUMENTS

| KR | 20030054368 A    | 7/2003 |
| KR | 20110096577 A    | 8/2011 |
| KR | 10-2012-0010936 A | 2/2012 |
| KR | 20160079495 A    | 7/2016 |

* cited by examiner

SYSTEM AND METHOD FOR EFFICIENTLY TRANSMITTING ERROR-TOLERANT TRAFFIC IN LOW POWER AND LOSSY NETWORKS

CROSS-REFERENCE TO RELATED APPLICATION

Pursuant to 35 U.S.C. § 119(a), this application claims the benefit of earlier filing date and right of priority to Korean Application No. 10-2018-0162374, filed on Dec. 14, 2018, the contents of which is incorporated by reference herein in its entirety.

BACKGROUND OF THE DISCLOSURE

1. Field of the Disclosure

The present disclosure relates to a function of a new medium access control (MAC) layer and a function of a network layer for efficiently transmitting error-tolerant traffic in mobile low power and lossy networks (LLNs). Specifically, in the present disclosure, a minimum symbol error rate (SER) of one-hop is set based on the number of end-to-end hops at the network layer, and an SER of a protocol data unit (PDU) among received packets is estimated to determine whether to receive a packet at the MAC layer.

2. Background of the Disclosure

In the LLNs requiring low power and low cost, bit information in a packet is frequently damaged due to signal attenuation and interference in a radio link. Therefore, in a MAC layer of the LLNs, in order to ensure reliability, an automatic repeat request (ARQ) technique in which a transmitting side adds an error detection field to a packet to be transmitted and a receiving side detects a packet whose bit information is damaged through the field and requests retransmission of the error-detected packet is used. In addition, when high reliability is required, a forward error control (FEC) technique in which the transmitting side adds a redundancy to a packet to be transmitted and the receiving side detects and corrects an error is used.

However, information such as an image, voice traffic, or interpolation enabled analog sensing data, which are mainly considered in the LLNs, is traffic which can be recovered even though a part of a bit sequence of the entire packets is damaged and has error-tolerant characteristics not degrading quality of experience (QoE) of a user.

Meanwhile, signaling information such as a disaster alert is traffic more important in transmission success than the contents of the transmitted packet. In the ARQ technique currently used to transmit error-tolerant traffic as mentioned above, retransmission is requested until a bit sequence of the entire packets is transmitted without any damage even in a situation that an SER of a first packet is sufficiently low. Therefore, enhancement of performance in transmitting the error-tolerant traffic is small and unnecessary retransmission occurs, resulting in additional energy consumption in a radio module. The FEC technique requires additional calculation for error correction to cause energy consumption.

SUMMARY OF THE DISCLOSURE

Therefore, an aspect of the detailed description is to solve the above-mentioned problems.

Another aspect of the detailed description is to improve energy efficiency in low power and lossy networks (LLNs) operating on a battery basis by omitting an additional retransmission or a redundancy calculation operation by recycling a packet including an error.

To achieve these and other advantages and in accordance with the purpose of this specification, as embodied and broadly described herein, a method for transmitting an error-tolerant traffic includes: when a packet is received, modifying a medium access control (MAC) layer of a receiving device to perform received signal strength indication (RSSI) sampling at a symbol rate and estimating a symbol error rate of the packet in the MAC layer based on the sampled RSSI value; and when the estimated symbol error rate is lower than a specific value, transmitting the received packet to a higher layer.

In an embodiment, the estimating may include determining a mode value among the sampled RSSI values as an RSSI value of the received packet, determining a symbol having an RSSI value higher than the RSSI value of the packet as an error symbol, and estimating the ratio of the number of error symbols to the total number of symbols, as a symbol error rate of the packet.

In an embodiment, the method may further include: dynamically setting a field for performing error detection in the packet at a MAC layer of a transmitting device according to a type of information transmitted in the packet, wherein an additional field for storing a length of the field for performing error detection is formed in the packet.

In an embodiment of the present disclosure, when the field for performing error detection is set to correspond to a part of the entire fields, storing a length of the field for performing error detection at the MAC layer of the transmitting device and calculating a frame check sum (FCS) detection field with the field for performing error detection as an input value, and setting the calculated FCS detection field as a footer of a frame; and when a cyclical redundancy check (CRC) value calculated with the received packet matches the footer and the symbol error rate of the packet is less than a specific value, transferring the received packet to a higher layer at the MAC layer of the receiving device.

In an embodiment, the estimating may include estimating an end-to-end symbol error rate in a MAC layer and a network layer of nodes existing in a network at the time of multi-hop transmission and the transferring may include transferring the packet to a higher layer when the end-to-end symbol error rate is less than a preset value.

In an embodiment, the method may further include: determining a symbol error rate to be satisfied in one-hop in order for the end-to-end symbol error rate to satisfy the preset value or less using the end-to-end symbol error rate at the network layer.

According to the present disclosure, since a packet including an error is recycled in LLNs having a high PER, an additional retransmission or a redundancy calculation operation is not performed, thereby enhancing energy efficiency of the LLNs operating based on a battery.

In the present disclosure, while a packet is reliably transmitted within a one-hop range, an SER of a packet in which a MAC layer is received is estimated using RSSI sampling and although an error is detected, the packet is not dropped but recycled, thereby preventing energy consumption due to retransmission or the like.

When an SER condition to be satisfied in the network layer designed in the present disclosure is given, the method of approximately calculating an SER value that may be accommodated in one-hop based on the number of hops of end-to-end is provided, thereby transmitting traffic satisfying a specific SER condition by end-to-end with a low calculation complexity.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
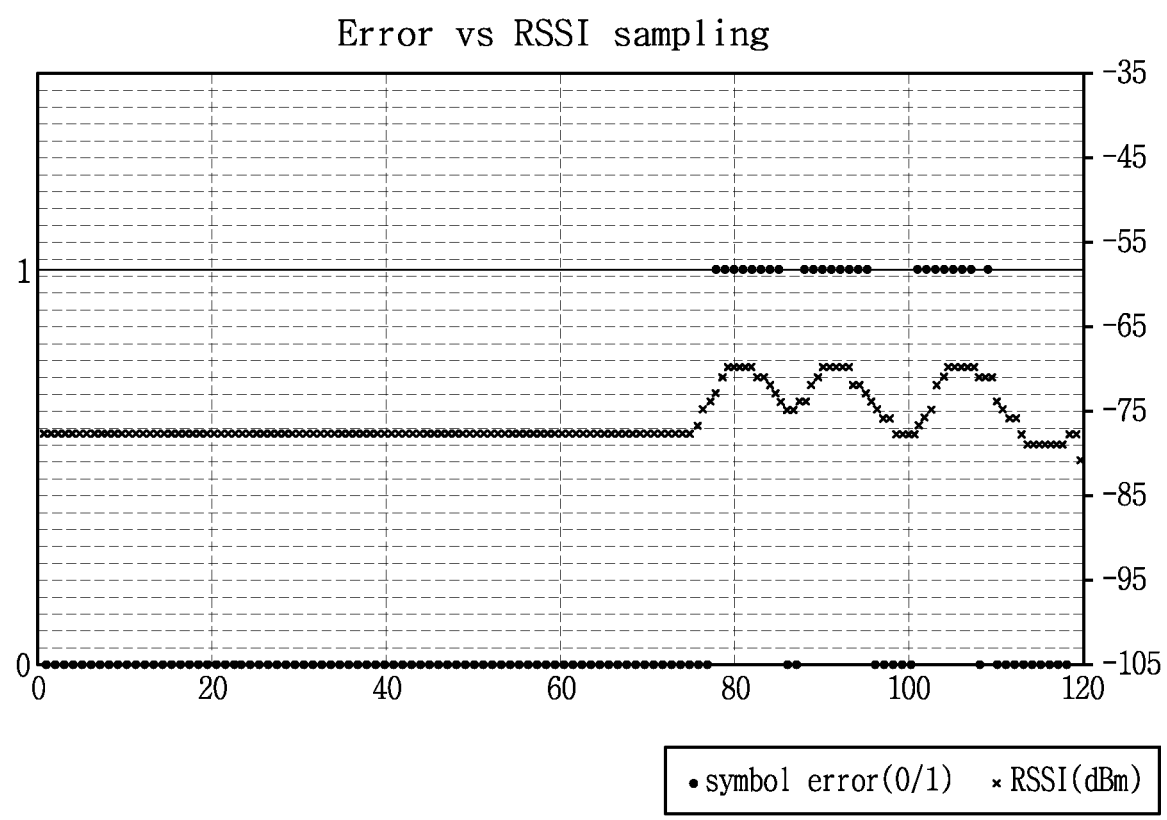
FIG. 1 is a conceptual diagram for explaining a method of estimating a symbol error rate (SER) of a packet based on received signal strength indication (RSSI) sampling according to an embodiment of the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

It is to be understood that when one element is referred to as being "connected to" or "coupled to" another element, it may be connected directly to or coupled directly to another element or be connected to or coupled to another element, having the other element intervening therebetween. Meanwhile, it is to be understood that when one element is referred to as being "connected directly to" or "coupled directly to" another element, it may be connected to or coupled to another element without the other element intervening therebetween.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

The present disclosure may include a system (or network) that is capable of transmitting error-tolerant traffic in low power and lossy networks (LLNs). The system may include a receiving device (receiving side) and a transmitting device (transmitting side), and each of the receiving device and each transmitting device may include a MAC layer and a network layer. The receiving device and the transmitting device may be named radio modules.

A method for efficiently transmitting error-tolerant traffic described herein may be performed by the system (or a controller that controls the network or the network), may be performed by the receiving device and the transmitting device included in the system, or may be performed by a MAC layer or a network layer (or a controller for controlling the MAC layer or the network layer) provided in each device.

The present disclosure may provide a MAC layer function and a network layer function for efficiently transmitting error-tolerant traffic in a low power and lossy networks (LLNs) environment.

In the LLNs environment, since loss in a link is more frequent than other networks, a packet error rate (PER) is high. Therefore, the number of retransmissions increases when using an ARQ technique, resulting in radio power consumption and, since the number of retransmissions increases in the LLNs operating based on a battery, energy consumption may be a problem.

A forward error control (FEC) technique also requires additional unnecessary calculation of redundancy for error correction in both the transmitting and receiving sides, resulting in additional energy consumption.

In the present disclosure, the MAC layer and the network layer used in the LLNs are modified to recycle a packet including an error in the LLNs having a high PER, thereby not performing an additional retransmission or unnecessary redundancy calculation operation, thus proposing a technique of enhancing energy efficiency of the LLNs operating based on a battery.

In the MAC layer designed in the present disclosure, information in the packet is classified into two types according to importance and the reliability requirement. First, there is information that requires 100% reliability for network and MAC layer operation. The MAC, Internet protocol (IP) header information, and a protocol data unit (PDU) of an IP control packet correspond to this information.

If such information is lost or altered, link or network malfunction may occur, and thus, it may be necessary to transmit the information without an error.

Second, there is error-tolerant information that may be accepted even though some bit sequence errors are present. A PDU of a data packet corresponds to this information. In the present disclosure, while a first type of packet is reliably transmitted in a one-hop range, a symbol error rate (SER) of a received packet is estimated using RSSI sample, so that a packet is not dropped but recycled even though an error is detected from a bit sequence transmitting a second type of information, thereby saving energy consumption lost due to retransmission, or the like.

When a SER condition that must be satisfied is given in the network layer designed in the present disclosure, an SER value that can be accepted in one-hop is calculated based on the number of end-to-end hops. Since the calculation requires high calculation complexity to be applied to the LLNs environment, a calculation for approximating it is defined additionally. Accordingly, traffic satisfying a specific SER condition is transmitted end-to-end with a low calculation complexity, thereby energy consumption that may be lost due to retransmission request and retransmission occurring as end-to-end.

Here, the hop is a part of a path located between a source and a destination in a computer network. One hop is generated each time a packet moves to next network equipment.

The hop counting may refer to the number of intermediate devices through which data must pass between the source and destination.

FIG. 1 is a conceptual diagram for explaining a method for estimating an SER of a packet in a MAC layer based on received signal strength indication (RSSI) sampling according to an embodiment of the present disclosure.

FIG. 1 shows an example of a relationship between RSSI values of respective symbols sampled by the radio module (or receiving device) and whether or not the corresponding symbols are erroneous. The blue axis indicates a value of 1 if an error occurs in each symbol and indicates a value of 0 otherwise.

The red axis indicates the RSSI value when each symbol is received and a unit thereof is dBm. Since a power adaptation operation of a symbol level is not defined in the LLNs, the symbols in one packet have the same RSSI value. However, when an external interference occurs, an RSSI value higher than the RSSI value is sampled due to interference, and a symbol having a high RSSI value in the interference and time axis includes an error with a high probability. Therefore, a relationship in which a symbol of a section where a high RSSI value appears has an error is shown in FIG. 1.

Figure 2:
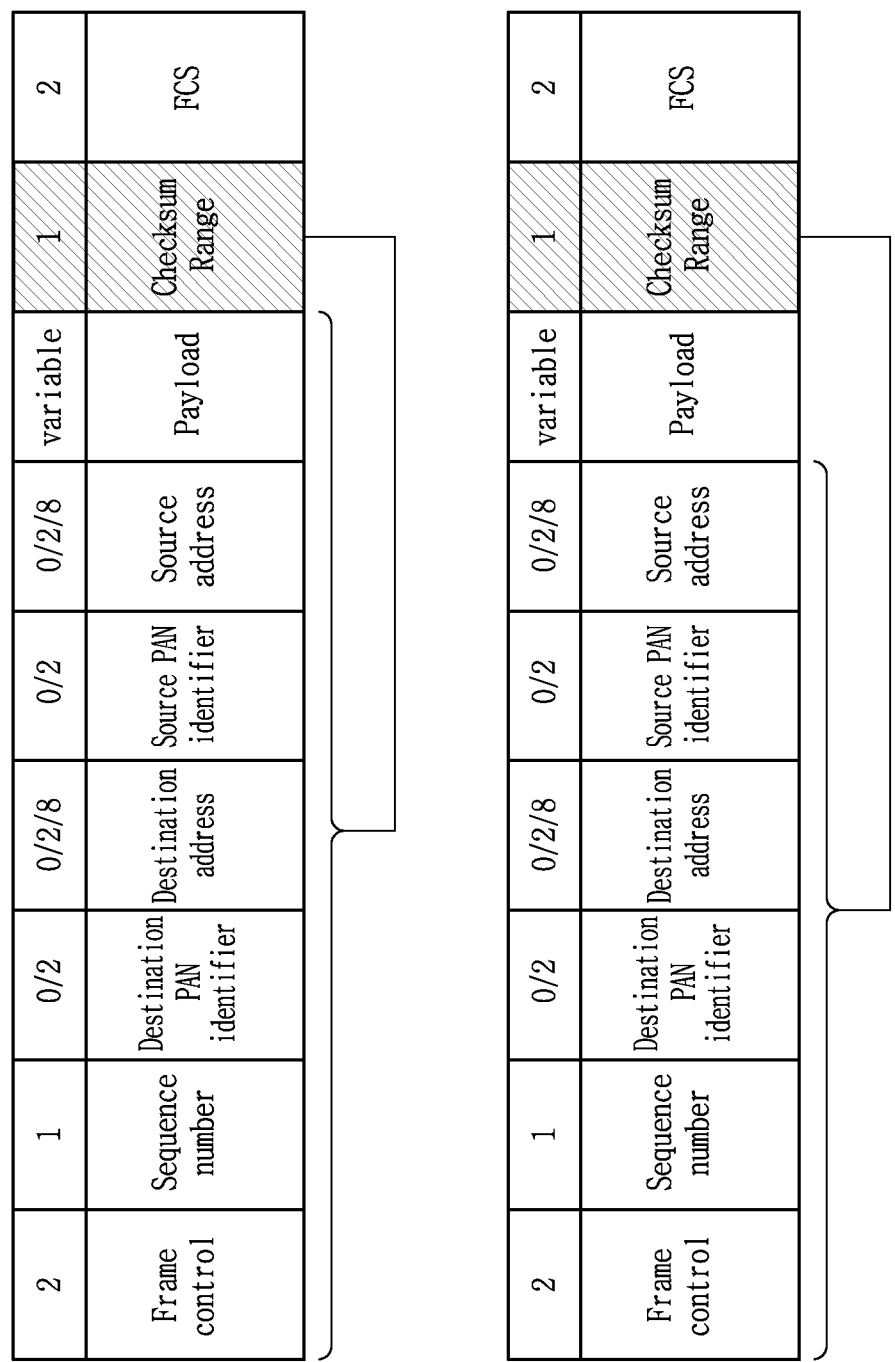
FIG. 2 is a conceptual diagram for explaining modification of a frame format in the present disclosure.

FIG. 2 is a conceptual diagram for explaining modification of a frame format in the present disclosure.

FIG. 2 shows the addition of a 1-byte field ("Checksum Range") to a standard frame format. Through the added field, information that must be reliably decoded in the frame is represented.

In the system according to an embodiment of the present disclosure, in the case of a network control packet, a header and the entire PDU section are designated as shown in the upper part of FIG. 2, and, in the case of a data packet, a link layer header section may be designated as shown in the lower part of FIG. 2.

Hereinafter, the functions of the MAC layer and the network layer for efficiently transmitting error-tolerant traffic in the LLNs according to an embodiment of the present disclosure will be described in more detail.

In one embodiment of the present disclosure, an application is assumed in which sources (or source nodes) send upstream traffic to a sink (or sink node) in a network, and since each node uses low transmission power (5 dBm or less) and a low-cost device, it must be able to operate at low power even in a situation that a symbol error rate (SER) value is extremely low.

To this end, in the present disclosure, three techniques (1. SER estimation through symbol-by-symbol RSSI sampling, 2. Designation of error detection interval based on reliability requirement, and 3. SER condition approximation required in one-hop) are designed.

[Part 1. SER Estimation Through Symbol-by-Symbol RSSI Sampling]

FIG. 1 shows an example of Part 1 operation. The radio module (or receiving device) included in the system according to the embodiment of the present disclosure samples RSSI at a symbol rate through over-clock of a micro controller (MCU) when a packet is received. The sampled sequence represents the RSSI of each symbol.

Since LLNs are single carrier systems that do not use such a system of power adaptation of a symbol level or orthogonal frequency division multiplexing (OFDM), all the RSSIs per symbol in a single packet have the same value.

However, when external interference occurs, a signal due to interference is added and an RSSI value higher than the RSSI value of the received packet is measured. Also, a symbol overlapped with the interference signal on the time axis is altered and an error occurs.

Using this fact, the system of the present disclosure defines a mode value of an RSSI sequence as an RSSI value of a packet, and defines a symbol having an RSSI value higher than the RSSI value as an error symbol.

The system (or receiving device) modifies the MAC layer of the LLNs and calculates the ratio of error symbols to the total number of symbols using the RSSI value obtained in a physical layer, thereby estimating (calculating, producing) an SER (symbol error rate) of the received packet.

Specifically, the receiving device performs RSSI sampling at a symbol rate by modifying the MAC layer of the receiving device and estimates a symbol error rate of the packet based on the sampled RSSI value, and if the error rate is less than or equal to a certain value, the receiving device may transfer the received packet to a higher layer.

The MAC layer of the receiving device determines whether to transmit the received packet to the higher layer in consideration of the estimated SER value and the conditions of Part 2 and Part 3.

At this time, the receiving device may determine a mode value among the sampled RSSI values as an RSSI value of the received packet, determine a symbol having an RSSI value higher than the RSSI value of the packet as an error symbol, and estimate the ratio of the number of error symbols to the total number of the symbols as a symbol error rate of the packet.

[Part 2. Designation of Error Detection Interval Based on Reliability Requirement]

In the present disclosure, the types of information to be transmitted in a packet are classified into two types according to importance and reliability requirement. The MAC and IP header in the packet must be transmitted reliably for proper packet transmission and forwarding. A network control packet must also be transmitted reliably for a normal operation and management of the network. If the above-mentioned information has an error, a communication function and a network function may malfunction, and thus, the information is required to have high reliability and an error must be detected.

Meanwhile, in the case of information left in a PDU of a data packet transporting error-tolerant traffic, even though some bit sequences are damaged, if the information satisfies a specific condition (for example, when the SER of the estimated packet is lower than the certain value) described in Part 2, the corresponding information may be recycled.

That is, depending on the type of information, reliability required between frames or between fields in a frame is different and another error detection method is required.

Accordingly, in the present disclosure, as shown in FIG. 2, a region for performing error detection is dynamically set in a frame and an additional field is set in a frame format called "checksum range".

The transmitting device may dynamically set a field in which the MAC layer performs error detection in the packet according to a type of information to be transmitted in the packet. At this time, an additional field may be formed in the packet to store a length of the field for error detection.

In the case of the network control packet, since both a header and information contained in a PDU require high reliability, the transmitting side calculates the same error detection field as the existing frame check sum (FCS), stores a total packet length in the checksum range, and transmits packets. The receiving side performs cyclical redundancy check (CRC) calculation on the length of the checksum range of the transmitted packet to determine whether or not an error is detected in the entire packets, transfers a packet in which no error is detected to a higher layer.

Meanwhile, when a data packet for transmitting error-tolerant traffic is transmitted, a framer of the transmitting device rearranges the information requiring reliability in the PDU in a section before the PDU. The framer of the transmitting device stores a length from the frame control field to the section including the information requiring reliability (for example, source address) in the checksum range field, calculates an FCS detection field by using the corresponding interval as an input value, and sets it to a footer.

That is, when the field for performing error detection is set to correspond to a part of the entire fields, the transmitting device may store the length of the field for performing error detection in the modified MAC layer of the transmitting device in the additional field, calculate the FCS detection field with the field for performing error detection as an input value, and set the calculated field as a footer of the frame.

The receiving device may transmit the received packet to a higher layer when the cyclic redundancy check (CRC) value calculated with the received packet matches the footer and the symbol error rate of the packet is lower than a specific value.

That is, the MAC layer of the receiving device compares the value of the checksum range field with the value of the total length of the frame to check that there is a difference and check whether the condition of Part1 (for example, when the estimated SER of the packet is lower than a specific value) and the CRC value calculated with the received packet match the footer transmitted from the transmitting side to determine whether to accept the packet.

If the field for performing error detection is set to correspond to a portion of the entire field (e.g., when a data packet that transmits error-tolerant traffic is transmitted), the MAC layer of the transmitting device (or the modified MAC layer) stores the length of the field for performing the error detection in the additional field (checksum range), calculates a frame check sum (FCS) detection field by using the field for performing the error detection as an input value, and sets it as a footer.

When the cyclic redundancy check (CRC) value calculated with the received packet matches the footer and the symbol error rate of the packet is less than the specific value, the MAC layer of the receiving device (or the modified MAC layer of the receiving device) may accept the received packet or transfer the received packet to the higher layer.

[Part 3. SER Condition Approximation Required in One-Hop]

The SER estimation mentioned in Part 1 is performed in one-hop, but actual data transmission in LLNs is transmitted in multi-hop based on routing. In the multi-hop transmission, errors occur independently for each transmission in each hop, so that the entire end-to-end transmission of the source node and the sink node is required to satisfy a preset SER value or less.

An end-to-end SER condition in the multi-hop may be represented as a function of SER conditions of one-hop. This function relationship follows Equation 1. In Equation 1, N denotes the number of hops between the source node and the sink node, SER_N, which is set as an input value, denotes an end-to-end SER value, SER_1 denotes a SER value to be satisfied in each one-hop, and alpha ($\alpha$) denotes a barrier value.

In Equation 1, when the assumption that a probability distribution of the link characteristics of each hop is independent is satisfied, the sign of equality is established and an upper bound of the end-to-end SER is formed. In the system of the present disclosure, when SER_N and $\alpha$ are given as external input values, the network layer may mathematically obtain the value of SER_1 using the hop information and Equation 1.

In addition, in the system (e.g., receiving device) of the present disclosure, when the SER of the one-hop is below a certain value and the end-to-end SER value is less than a predetermined value, the packet may be transferred to the higher layer.

That is, in the receiving device, in the case of multi-hop transmission, the MAC layer and the network layer of the nodes existing in the network estimate an end-to-end symbol error rate cooperatively, and if the end-to-end symbol error rate is less than a preset value, the packet may be transferred to the higher layer.

Meanwhile, the system of the present disclosure may use Equation 2 to simplify the complicated operation of Equation 1.

For example, in order to calculate Equation 1, a radical root is required to be calculated. However, a low-power node in the LLNs environment uses a low-cost MCU, which may make it difficult to perform a floating point operation.

In order to solve this problem, a method of obtaining a value iteratively by deriving Equation 2 approximating Equation 1 through a numerical analysis method may be proposed in the present invention. In Equation 2, SER_1,$n$ denotes an approximate value of SER_1 in an nth iterative stage, and SER_1,$n$+1 denotes an approximate value of SER_1 in (n+1)th iterative stage.

In the system of the present disclosure, an approximation of the final SER_1 may be derived through n+1 iteration at each network layer of the devices in the network. The approximation has a calculation complexity of O (Nn) and has low calculation complexity because the N value signifying the number of hops has a small value.

$$SER_N \le (SER_1 + a)^N \leftrightarrow SER_1 + a \ge \sqrt[N]{SER_N} \quad \text{[Equation 1]}$$

$$SER_{1,n+1} = SER_{1,n} - \frac{(SER_{1,n} + a)^N - SER_N}{N \cdot (SER_{1,n} + a)^{N-1}} \quad \text{[Equation 2]}$$

That is, in the system (receiving device) of the present disclosure, in the case of multi-hop transmission, the MAC layer and the network layer may cooperatively estimate an end-to-end symbol error rate.

In other words, the receiving device may estimate the end-to-end symbol error rate in the MAC layer and the network layer of the nodes existing in the network at the time of multi-hop transmission.

Thereafter, the system (receiving device) may transfer the packet to the higher layer when the end-to-end symbol error rate is less than the preset value.

At this time, the system (receiving device) of the present disclosure, using the end-to-end symbol error rate at the network layer, may determine a symbol error rate to be satisfied in one-hop for the end-to-end symbol error rate to satisfy the preset value or less.

[Performance Verification Through Experiment]

Figure 3:
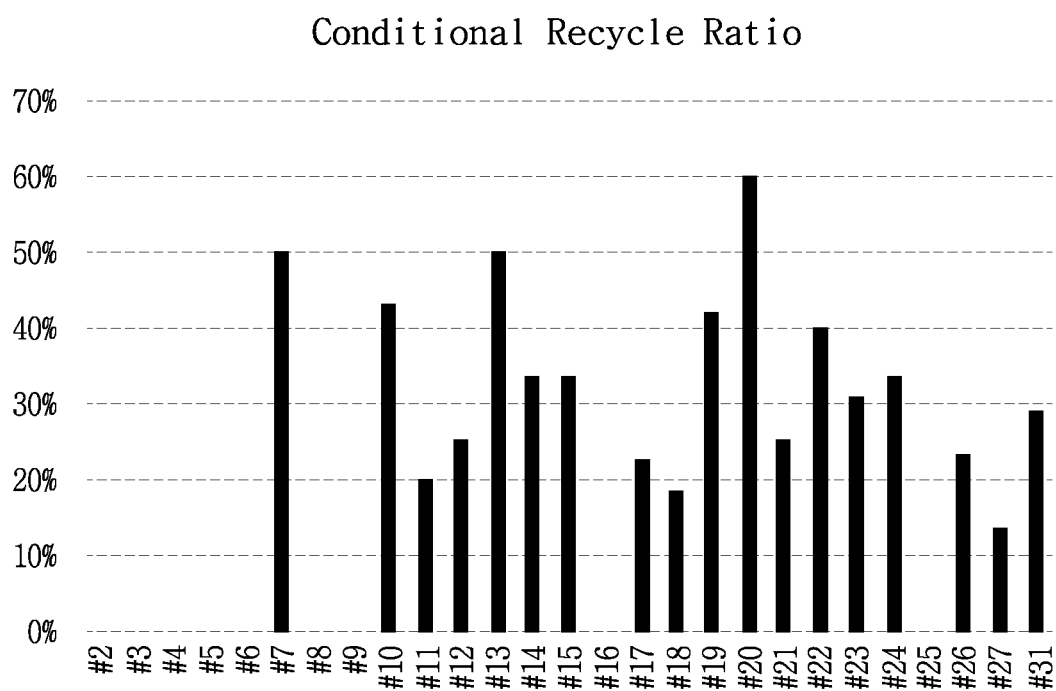
FIG. 3 is a graph illustrating the number of packet transmissions that are shortened at each source node compared to an existing ARQ technique according to an embodiment of the present disclosure.

FIG. 3 is a graph illustrating the number of packet transmissions that are shortened at each source node compared to the existing ARQ scheme according to an embodiment of the present disclosure.

A test-bed based experiment was conducted to confirm the performance improvement obtained by the present disclosure. The experiment was conducted in a Contiki OS-based test-bed consisting of 30 source nodes and 1 sink node, and each node includes an IEEE 802.15.4-based CC2420 radio module. Each source node is fixed without mobility and generates an 80 bytes payload as uplink traffic from an application with a 5-minute IPI. All nodes use transmission power of 0 dBm and an antenna of 5 dBi gain is attached. A channel used for packet transmission is #26 channel of IEEE 802.15.4 a frequency band of the channel overlaps a frequency band of #13 channel the Wi-Fi channels.

In this experimental environment, the number of packet transmissions in each source node compared to the existing ARQ through the scheme proposed by the present disclosure is shown in the graph of FIG. 3.

Referring to FIG. 3, it can be seen that packets with error-tolerant traffic satisfying an error rate are recycled by the method of the present disclosure to reduce retransmissions, thereby preventing energy consumption caused due to retransmissions.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for transmitting an error-tolerant traffic, the method comprising:
   when a packet is received, modifying a medium access control (MAC) layer of a receiving device to perform received signal strength indication (RSSI) sampling at a symbol rate and estimating a symbol error rate of the packet in the MAC layer based on the sampled RSSI value; and
   when the estimated symbol error rate is lower than a specific value, transmitting the received packet to a higher layer.

2. The method of claim 1, wherein
   the estimating includes determining a mode value among the sampled RSSI values as an RSSI value of the received packet, determining a symbol having an RSSI value higher than the RSSI value of the packet as an error symbol, and estimating the ratio of the number of error symbols to the total number of symbols, as a symbol error rate of the packet.

3. The method of claim 1, further comprising:
   dynamically setting a field for performing error detection in the packet at a MAC layer of a transmitting device according to a type of information transmitted in the packet,
   wherein an additional field for storing a length of the field for performing error detection is formed in the packet.

4. The method of claim 3, wherein
   when the field for performing error detection is set to correspond to a part of the entire fields, storing a length of the field for performing error detection in the MAC layer of the transmitting device and calculating a frame check sum (FCS) detection field with the field for performing error detection as an input value, and setting the calculated FCS detection field as a footer of a frame; and
   when a cyclical redundancy check (CRC) value calculated with the received packet matches the footer and the symbol error rate of the packet is less than a specific value, transferring the received packet to a higher layer at the MAC layer of the receiving device.

5. The method of claim 1, wherein
   the estimating includes estimating an end-to-end symbol error rate at a MAC layer and a network layer of nodes existing in a network at the time of multi-hop transmission and the transferring includes transferring the packet to a higher layer when the end-to-end symbol error rate is less than a preset value.

6. The method of claim 5, further comprising:

determining a symbol error rate to be satisfied in one-hop in order for the end-to-end symbol error rate to satisfy the preset value or less using the end-to-end symbol error rate at the network layer.

\* \* \* \* \*